(12) United States Patent
Weiser et al.

(10) Patent No.: US 8,579,104 B2
(45) Date of Patent: Nov. 12, 2013

(54) CONVEYOR BELT AND MODULE ACCOMMODATING ROD GROWTH

(75) Inventors: David C. Weiser, River Ridge, LA (US); Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 415 days.

(21) Appl. No.: 12/858,769

(22) Filed: Aug. 18, 2010

(65) Prior Publication Data

US 2011/0278138 A1 Nov. 17, 2011

Related U.S. Application Data

(63) Continuation-in-part of application No. 12/779,525, filed on May 13, 2010, now abandoned.

(51) Int. Cl.
*B65G 17/08* (2006.01)

(52) U.S. Cl.
USPC .......................................................... 198/853

(58) Field of Classification Search
USPC ......................................... 198/851, 852, 853
See application file for complete search history.

(56) References Cited

U.S. PATENT DOCUMENTS

| RE30,035 E | 6/1979 | Miller |
| 4,949,838 A | 8/1990 | Lapeyre et al. |
| 4,972,942 A | 11/1990 | Faulkner |
| 4,974,724 A | 12/1990 | Lapeyre |
| 5,083,660 A | 1/1992 | Horton |
| 5,156,262 A | 10/1992 | Horton |
| 5,224,583 A | 7/1993 | Palmaer |
| 5,332,084 A | 7/1994 | Greve |
| 5,598,916 A | 2/1997 | Horton |
| 5,850,902 A * | 12/1998 | Hicks et al. .............. 198/457.05 |
| 5,906,270 A | 5/1999 | Faulkner |
| 5,921,379 A | 7/1999 | Horton |
| 6,036,001 A | 3/2000 | Stebnicki et al. |
| 6,073,756 A * | 6/2000 | Damkjær et al. ............. 198/853 |
| 6,216,854 B1 | 4/2001 | Damkjaer et al. |
| 6,345,715 B2 | 2/2002 | Palmaer |
| 6,357,581 B1 | 3/2002 | Guldenfels |
| 6,814,223 B1 | 11/2004 | Verdigets et al. |
| 6,837,367 B1 | 1/2005 | Klein et al. |
| 7,070,043 B1 | 7/2006 | MacLachlan et al. |
| 7,073,662 B2 | 7/2006 | Neely et al. |
| 7,111,722 B2 * | 9/2006 | Burch .......................... 198/411 |
| 7,377,380 B2 | 5/2008 | Menke et al. |
| 7,635,060 B2 | 12/2009 | Lagneaux |
| 2010/0025200 A1 | 2/2010 | Fandella |

OTHER PUBLICATIONS

International Search Report and Written Opinion of the ISA/EP for International Patent Application No. PCT/US11/31822, mailed Jul. 13, 2011, European Patent Office, Rijswijk, NL.
Intralok L.L.C.,"Product Line Extension: Series 9000 Flush Grid" Brochure, copyright 2009, pp. 1-2, Intralox, L L.C., Harahan, Louisiana, U.S.A.

* cited by examiner

*Primary Examiner* — Kavel Singh
(74) *Attorney, Agent, or Firm* — James T. Cronvich

(57) ABSTRACT

A modular plastic conveyor belt that is useful in accommodating hinge rods that tend to lengthen during use and an edge module for constructing such a belt. An edge portion of the edge module has an elongated link end that provides an unimpeded growth path for a hinge rod within the confines of the belt. The edge portion of one edge module is hooked to the edge portion of an adjacent edge module by a pivot that is pivotally received in a mating receptacle on the adjacent module.

26 Claims, 4 Drawing Sheets

US 8,579,104 B2

CONVEYOR BELT AND MODULE ACCOMMODATING ROD GROWTH

CROSS-REFERENCE TO RELATED APPLICATIONS

This application is a continuation-in-part of co-pending U.S. patent application Ser. No. 12/779,525, "Conveyor Belt and Module Accommodating Rod Growth," filed May 13, 2010, and incorporated entirely in this specification by reference.

BACKGROUND

The invention relates generally to power-driven conveyors and more particularly to modular plastic conveyor belts.

Modular plastic conveyor belts are constructed of a series of rows of one or more belt modules linked together end to end by hinge rods received in the interleaved hinge eyes of consecutive rows. One use for a modular plastic conveyor belt having a lot of open area for good air flow is as a cooling belt for rubber extrusions, such as tire tread and sidewall extrusions. Hinge rods made of polypropylene or acetal are commonly used in modular plastic belts and tend to wear out fairly quickly in abrasive environments, such as in a rubber-processing or tire plant's cooling line. Hinge rods made of certain nylon materials, such as nylon 6-6, have been shown to markedly increase rod life. As a consequence, nylon hinge rods are sometimes used in cooling belts. But, to hasten cooling, water is sprayed on the tire components as they are conveyed on the cooling belt. The nylon hinge rods absorb water, which causes them to grow in diameter and length. If the ends of the rods are not confined by the belt structure, the ends can grow past the outside edges of the belt and snag people or things alongside the conveyor. If the ends are confined by structure in the edges of the belt, the growing rods can push against and deform or break the edges of the belt. Sometimes the nylon hinge rods are cut short in order to accommodate the expected growth. In this case, the rods could be significantly short on wide belts, which would leave several links on the outside edge of the belt without rods. This leaves those links vulnerable to damage and reduces the effective pull strength of the belt. Thus, there is a need for a conveyor belt that can accommodate hinge-rod growth.

SUMMARY

A conveyor belt module embodying features of the invention comprises a main portion and an edge portion. The main portion extends longitudinally from a first end to a second end of the module and laterally from a first side to a second side of the main portion. Hinge elements are spaced apart along the first and second ends of the module in the main portion. Apertures through the hinge elements are aligned along each end of the module. The edge portion extends outward from the first side of the main portion. The edge portion has an outside edge distal from the first side of the main portion. A receptacle is formed in the edge portion along one end of the module. A pivot member extends from the edge portion along the other end. The pivot member aligns longitudinally with the receptacle and has a pivot axis aligned laterally with the hinge elements along that end of the conveyor belt module.

In another aspect of the invention, a conveyor belt embodying features of the invention comprises a series of rows of belt modules. Each of the rows extends longitudinally in a direction of belt travel from a first end to a second end and laterally from a first outside edge to a second outside edge. A first set of hinge elements are spaced apart along the first end of the row, and a second set are spaced apart along the second end. Laterally aligned apertures in each set of hinge elements form lateral passageways through the interleaved hinge elements of adjacent rows of modules. Hinge rods received in the lateral passageways hingedly connect the rows together. Each of the rows includes an edge module at each of the outside edges. Each edge module comprises a main portion that forms at least some of the first and second hinge elements of the row and an edge portion that extends laterally from the main portion to the outside edge. The edge portion includes a receptacle aligned with the lateral passageway along the first end of the row and a pivot member longitudinally aligned with the receptacle. The pivot member has a pivot axis laterally aligned with the lateral passageway along the second end of the row. The pivot member at the second end of the row is pivotally received in the receptacle at the first end of an adjacent row to pivotally connect the edge modules of adjacent rows.

BRIEF DESCRIPTION OF THE DRAWINGS

These aspects and features of the invention, as well as its advantages, are better understood by reference to the following description, appended claims, and accompanying drawings, in which:

DETAILED DESCRIPTION

Figure 1:
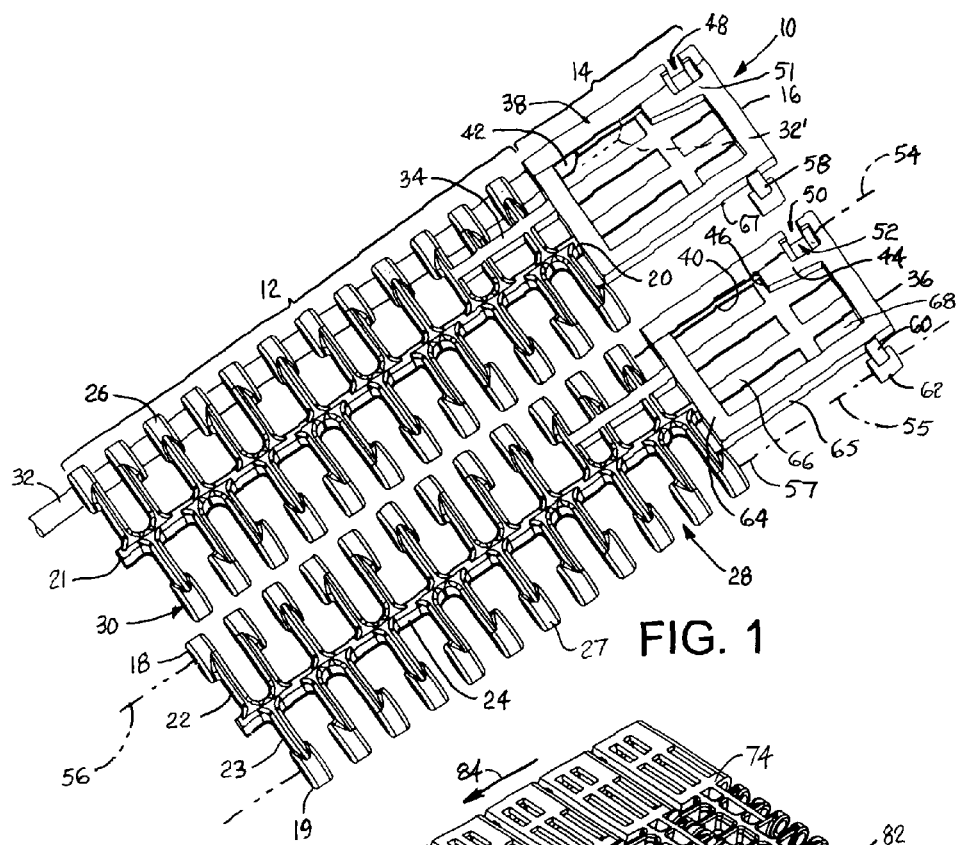
FIG. 1 is a bottom axonometric view of two belt-edge modules embodying features of the invention.

Two consecutive edge modules embodying features of the invention and suitable for use in a conveyor belt in a cooling line are shown in FIG. 1. Each belt module is an edge module 10 having a main portion 12 and an edge portion 14 forming an outside edge 16 of the module. The module extends longitudinally, i.e., in the direction in which a conveyor belt made of the modules would travel, from a first end 18 to an opposite second end 19 of the module. The main portion 12 extends laterally, i.e., along the width of a conveyor belt made of the modules, from a first side 20 to an opposite second side 21. First and second sets of links 22, 23 extend longitudinally from opposite sides of a lateral rib 24 in the main portion 12 of the belt module. The lateral rib forms a central spine of the main portion of the module midway between the first and second ends and can also serve as a drive bar against which teeth of a drive sprocket drive a belt made of these modules. The first and second sets of links 22, 23 terminate in link ends that serve as hinge elements 26, 27 at the first and second ends 18, 19 of the module. The hinge elements 26 along the first end of the module are offset from the hinge elements 27 along the second end so that the first set of hinge elements 26 can be interleaved with the second set of hinge elements 27 in an adjacent module with the outside edges 16 of the modules in longitudinal alignment. Spaces 28 between laterally consecutive hinge elements on each end of the module are greater than the thicknesses of the hinge elements to allow the hinge elements to interleave. Apertures 30 through the hinge elements are aligned laterally and form a lateral passageway with the apertures in the interleaved hinge elements of an adjacent module. A hinge rod 32 received in the lateral passageway between two adjacent modules connects the modules together at a hinge joint at which the modules 10 can articulate about a drive or idle sprocket or a return roller or shoe.

The edge portion 14 of the edge module 10 is attached to the first side 20 of the main portion 12. The lateral rib 24 and a lateral stiffening bar 34, which traverses several of the links 22 between the central rib and the first end 18 of the module, connect the edge portion to the main portion of the module. The stiffening bar, besides increasing the beam stiffness of the module near the first side, provides additional cantilever support to the edge portion 14 to prevent it from twisting about the lateral rib 24.

The edge portion 14 extends outward from the first side 20 of the main portion 12 to its distal outside edge 16, which has an outwardly facing wall 36 that gives a belt made of these edge modules a flush edge. The edge portion is generally rectangular and has a laterally elongated link end 38 at the first end 18 of the module. The elongated link end has a concave inner surface 40, which nestles the end 42 of the hinge rod. A thickened region 44 extending to the outside edge 16 has an interior surface 46 that is laterally aligned with the hinge rod 32 and the lateral passageway. The surface 46 is spaced from the main portion 12 by a distance great enough to allow the hinge rod to lengthen without contacting the surface and pushing outwardly against it. This distance may be as much as about one inch.

In a normal belt construction, the end 42 of the headless hinge rod resides in the edge portion 14 to ensure that the rod extends through all the hinge elements. A dry rod extends slightly into the edge portion. A wet rod 32' that has absorbed a lot of water extends farther into the edge portion, but not far enough to contact the surface 46 and cause the module to distort or break. Thus, the edge portion provides an unimpeded axial growth path for a hinge rod.

The thickened region 44 of the edge portion also provides enough material for a receptacle 48 to be formed in the elongated link end 38 of the edge portion 14. The receptacle has a slot 50 that opens onto the elongated link end in the bottom 51 of the edge portion. The slot communicates with an open cylindrical cavity 52 that opens onto the bottom of the edge portion and has an axis 54 aligned with the hinge axis 56 of the aligned apertures of the first set of hinge elements 26 along the first end 18 of the module. A complementarily shaped pivot member 58 extends longitudinally outward from the end portion 14 opposite the receptacle. The pivot member and the receptacle are aligned longitudinally in the edge portion of the module proximate the outside edge 16. The pivot member 58 has a longitudinally extending arm 60 that terminates in a pivot 62, which has a lateral pivot axis 55 aligned with the hinge axis 57 formed by the aligned apertures through the hinge elements 27 along the second end 19 of the module. The slot 50 admits the arm 60 of the pivot member of an adjacent module, and the cavity 52 receives the pivot 62 and allows it to pivot in the cavity in line with the hinge rod. The pivot connection also hooks the edge portions of adjacent modules together near the outside edge to prevent them from separating.

The edge portion 14 also includes longitudinal and lateral frame sections 64, 65 that join with the outside edge wall 36 and the elongated link end 38 to form an outer frame. A top deck 66 with openings 68 provides a support surface on the conveying side 67 of the edge portion with plenty of open area for air to flow through the edge portion.

The modules may be made of thermoplastic materials, such as polyethylene, polypropylene, acetal, or composite polymers in an injection-molding process. The hinge rod is made of a durable, abrasion-resistant material, such as nylon 6-6, which also tends to absorb water and to lengthen.

Figure 5:
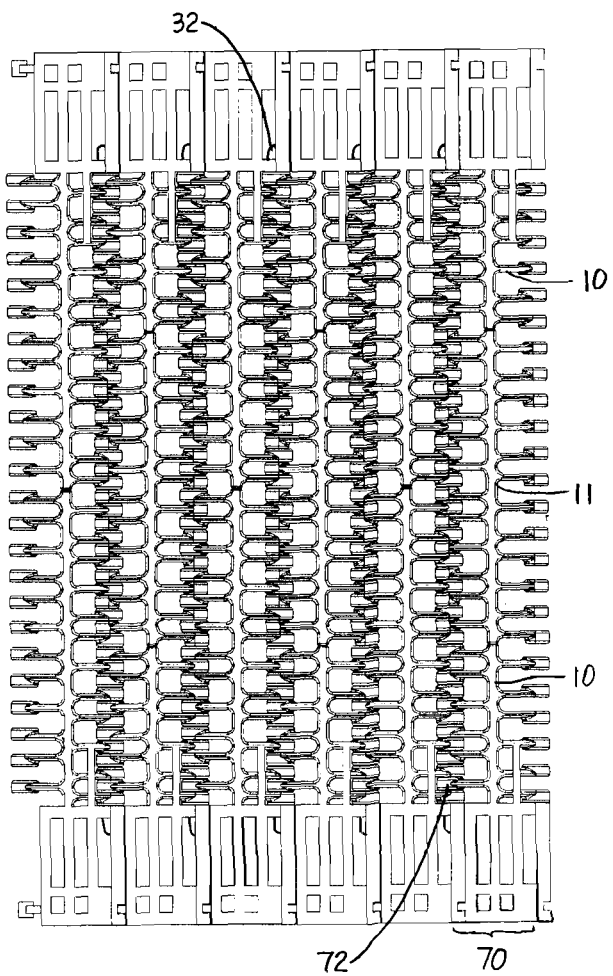
FIG. 5 is a top plan view of the full width of a portion of the conveyor belt of FIG. 2.

The edge modules 10 shown in FIG. 1 are joined side by side with other edge modules and interior modules 11 which do not include edge portions, to form a belt row 70, as shown in FIG. 5. Consecutive rows of belt modules are joined end to end at hinge joints 72 by hinge rods 32 received in the interleaved hinge elements of adjacent rows to form an endless conveyor belt 74.

Figure 2:
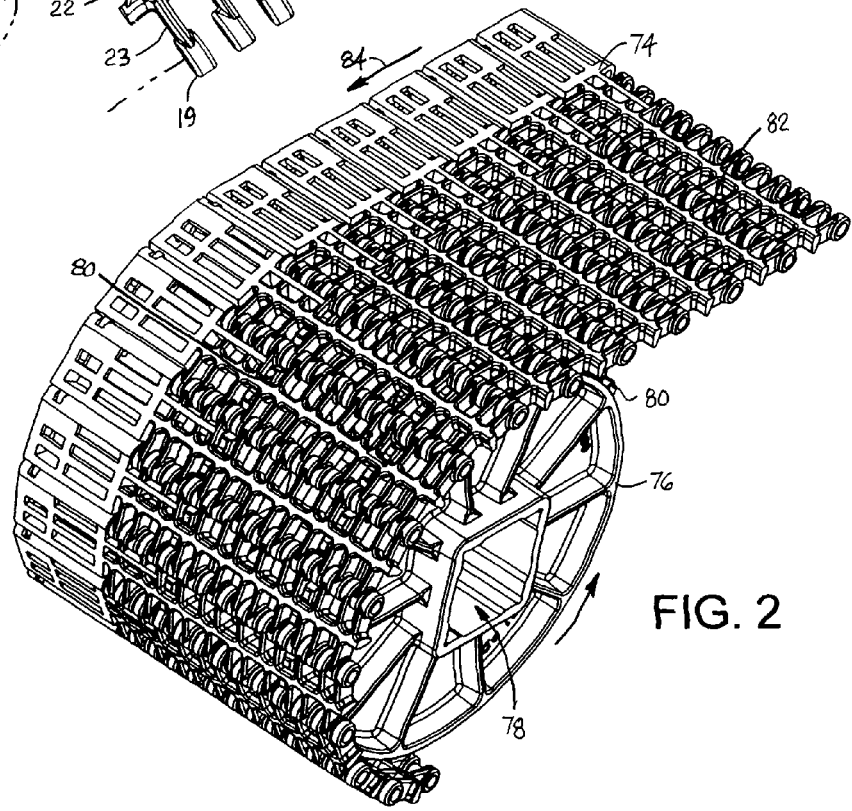
FIG. 2 is an isometric view of a portion of a conveyor belt constructed of belt-edge modules as in FIG. 1.
Figure 3:
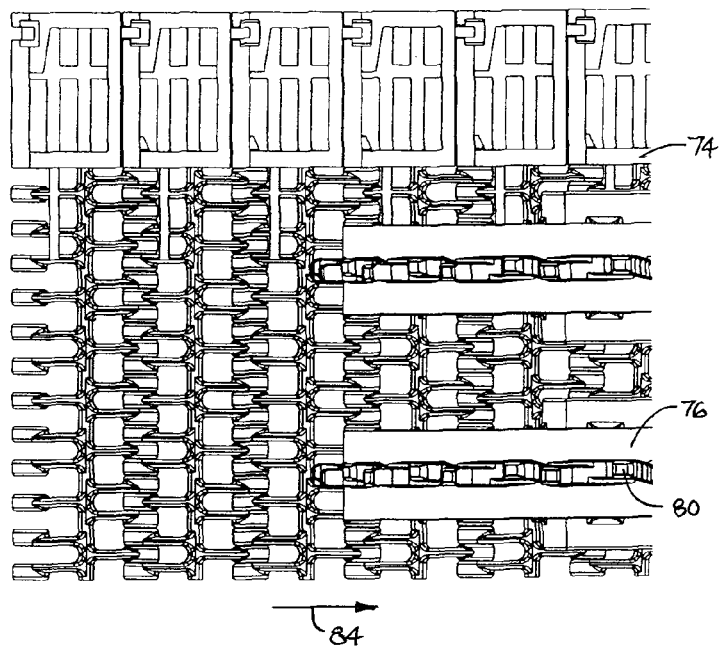
FIG. 3 is a bottom plan view of the conveyor belt of FIG. 2.
Figure 4:
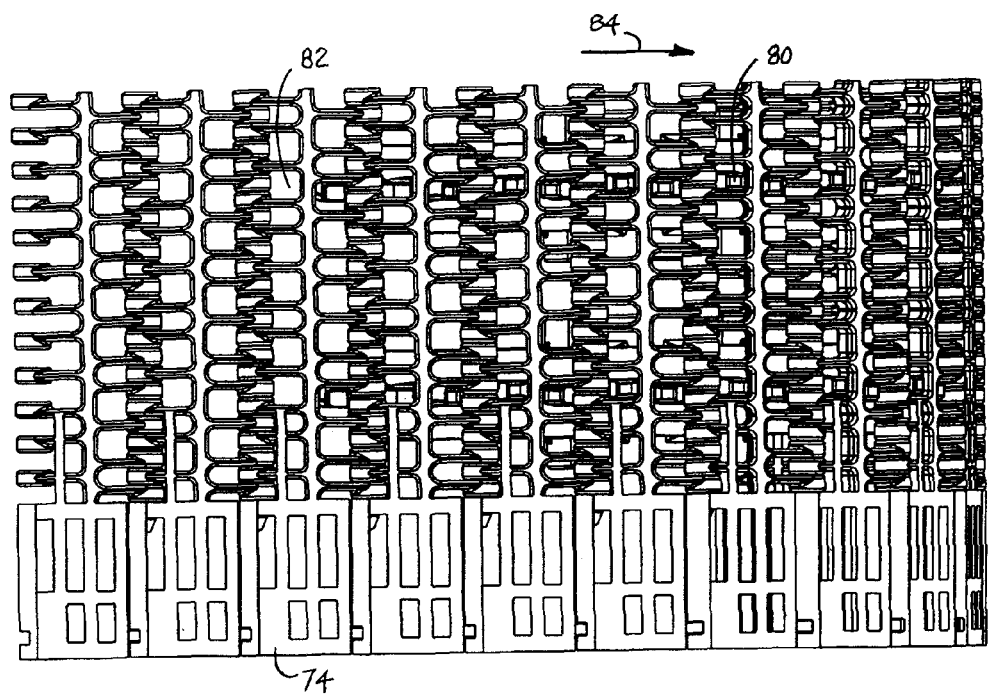
FIG. 4 is a top plan view of the conveyor belt of FIG. 2.

As shown in FIGS. 2-4, which depict one side of the belt, the belt 74 is wrapped around a set of drive sprockets 76 having bores 78 for mounting on a shaft rotated by a motor (not shown). Sprocket teeth 80 on the periphery of the drive sprocket extend into gaps 82 between the lateral rib 24, or drive bar, and the hinge elements of an adjacent module and push against the drive bar to move the belt in a direction of belt travel 84 as the sprockets rotate. The endless belt loop is trained between drive sprockets 76 and similar idle sprockets (not shown).

Figure 6A:
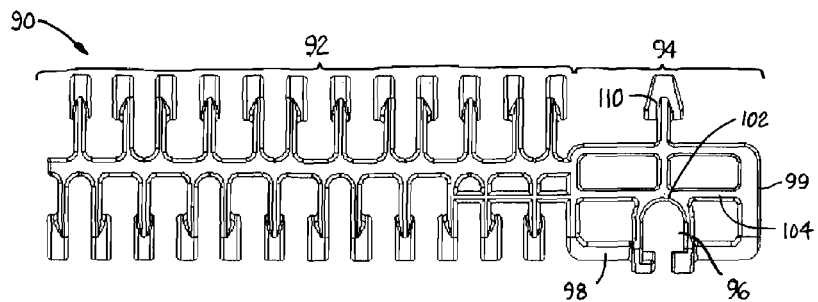
FIGS. 6A and 6B are top and bottom plane views of another version of an edge module embodying features of the invention.
Figure 6B:
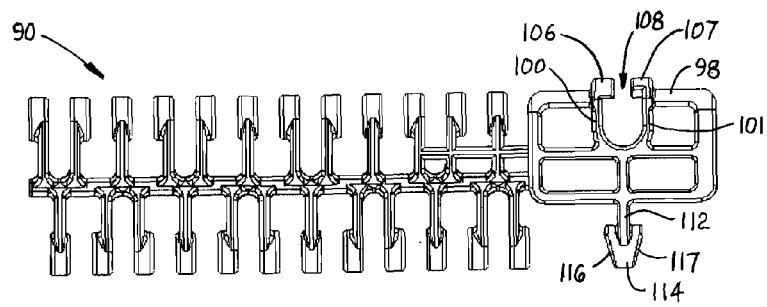

Another version of an edge module that can be connected together with other modules and hinge rods to construct a conveyor belt as in FIGS. 2-4 is shown in FIGS. 6A and 6B. The edge module 90 comprises a main portion 92, which is shown as identical to the main portion 12 of the edge module 10 of FIG. 1, and an edge portion 94, which differs from the edge portion 14 of the edge module of FIG. 1. In the edge portion 94, a horseshoe-shaped receptacle 96 is positioned generally midway along a laterally elongated link end 98, but it could be closer or farther from the outside edge 99 of the module. The receptacle 96 separates the link end 98 into two segments that extend laterally from opposite side walls 100, 101 of the receptacle. The rounded closed end 102 of the horseshoe-shaped receptacle 96 is formed with a strengthening rib 104 that extends laterally across the edge portion 94. Ears 106, 107 at the open end of the receptacle extend toward each other from opposite side walls 100, 101. The confronting faces of the ears are separated by a slot 108 opening into the receptacle. A pivot member 110 extends longitudinally outward from the opposite end of the edge portion 94. Like the pivot member 58 of the edge module 10 in FIG. 1, the pivot member 110 has a longitudinally extending arm 112 that terminates in a pivot 114. Opposing sides 116, 117 of the pivot 114 are angled to converge with distance from the arm 112. Thus, the pivot is thicker at its junction with the arm. The pivot member's arm 112 is aligned laterally with the slot 108 at the open end of the receptacle 96. Although the edge module 90 is shown with one pivot member and one receptacle, the module could have two or more of each spaced along the width of the edge portion.

Figure 7A:
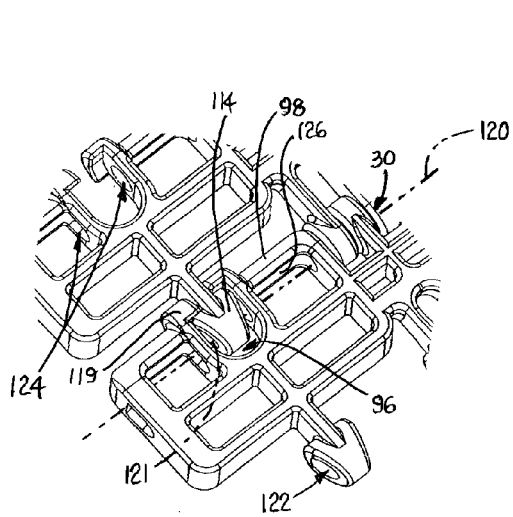
FIGS. 7A and 7B are top and bottom enlarged axonometric views of the edge portions of two connected edge modules of FIGS. 6A and 6B.
Figure 7B:
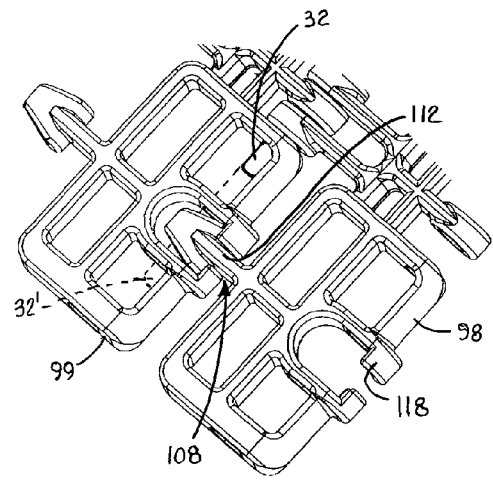

As shown in FIGS. 7A and 7B, the pivot 114 is received in the receptacle 96 of an adjacent edge module with the arm 112 residing in the slot 108. Hooks 118, 119 at the ends of the ears 106, 107 retain the pivot in place in the receptacle. Although the hook 119 on the outer side wall 101 is shown on the top side of the module and the hook 118 on the inner side wall 100 is shown on the bottom side, both could be formed on either the top side or the bottom side. The hinge axis 120 through the lateral passageway formed by the aligned apertures 30 in the interleaved hinge elements 26, 27 in the main portions 92 of the joined, adjacent modules is aligned with the pivot axis 121 of the pivot 114. Unlike the pivot 62 in the module 10 of FIG.

1, the pivot 114 has an aperture 122 coaxial with the hinge axis 120 and the pivot axis 121. Apertures 124 through the side walls 100, 101 of the receptacle 96 are also aligned with the hinge and pivot axes at the hinge joint. The apertures in the pivot and the side walls of the receptacle facilitate entry of the hinge rod 32 through the edge portion 94 and into the lateral passageway. The converging sides 116, 117 of the pivot also aid in guiding the hinge rod into the apertures without catching. And, as shown in FIG. 7B, even though the hinge rod need extend from the main portion only slightly into the edge portion 94, the apertures in the pivot and the side walls of the receptacle accommodate growth of a wet rod 32' out to a position closer to the outside edge 99 of the module 90. A concave inner surface 126 on the segmented elongated link end 98 nestles the end of the hinge rod that extends into the edge portion 94 of the module 90.

The details of the specific examples are used to help describe the invention. The scope of the invention is defined by the following claims.

What is claimed is:

1. A conveyor belt module comprising:
   a main portion extending longitudinally from a first end to a second end of the conveyor belt module and laterally from a first side to a second side of the main portion and including:
      a first set of hinge elements spaced apart along the first end having aligned apertures, and
      a second set of hinge elements spaced apart along the second end having aligned apertures; and
   an edge portion extending outward from the first side of the main portion, wherein the edge portion includes:
      an outside edge distal from the first side of the main portion,
      a receptacle formed in the edge portion along one of the first and second ends of the conveyor belt module, and
      a pivot member extending from the edge portion along the other of the first and second ends, the pivot member aligned longitudinally with the receptacle and having a pivot axis aligned laterally with the set of hinge elements at that end of the conveyor belt module;
   wherein the pivot member includes a pivot defining the pivot axis and an arm attached to the edge portion and extending in the longitudinal direction from the pivot.

2. A conveyor belt module as in claim 1 wherein the edge portion further includes a laterally elongated link end extending laterally along one of the first and second ends of the conveyor belt module from the first side of the main portion to the outside edge.

3. A conveyor belt module as in claim 2 wherein the edge portion further includes a thickened region along the laterally elongated link end in which the receptacle is formed.

4. A conveyor belt module as in claim 2 wherein the receptacle is positioned midway along the laterally elongated link end.

5. A conveyor belt module as in claim 1 wherein the main portion includes lateral ribs extending past the first side and joining the edge portion to the main portion.

6. A conveyor belt module as in claim 1 wherein the pivot member includes an aperture therethrough coaxial with the pivot axis.

7. A conveyor belt module as in claim 1 wherein the receptacle includes a pair of laterally spaced side walls having apertures therethrough aligned with the aligned apertures of the one of the first and second sets of hinge elements at the same end of the conveyor belt module.

8. A conveyor belt module as in claim 1 wherein the receptacle and the pivot member are complementarily shaped.

9. A conveyor belt module as in claim 1 wherein the receptacle and the pivot member are positioned proximate the outside edge of the edge portion.

10. A conveyor belt module as in claim 1 wherein the receptacle includes a slot shaped to receive the arm of the pivot member of an adjacent conveyor belt module and a cavity communicating with the slot to receive the pivot of the adjacent conveyor belt module.

11. A conveyor belt module as in claim 1 wherein the pivot has sides that converge with distance from the arm.

12. A conveyor belt constructed of a series of conveyor belt modules as in claim 1 hingedly connected end to end by hinge rods received in the aligned apertures of the interleaved first and second sets of hinge elements of adjacent conveyor belt modules and by the pivot members pivotally received in the receptacles of adjacent conveyor belt modules.

13. A conveyor belt comprising:
   a series of rows of belt modules, each of the rows extending longitudinally in a direction of belt travel from a first end to a second end and laterally from a first outside edge to a second outside edge and having a first set of hinge elements laterally spaced apart along the first end and forming laterally aligned apertures and a second set of hinge elements laterally spaced apart along the second end and forming laterally aligned apertures, wherein the first set of hinge elements along the first end of a row interleave with the second set of hinge elements along the second end of an adjacent row to form lateral passageways through the interleaved hinge elements of adjacent rows;
   a plurality of hinge rods received in the lateral passageways to hingedly connect the rows together;
   wherein each of the rows includes an edge module at each of the first and second outside edges, each edge module comprising a main portion forming at least some of the first and second hinge elements of the row and an edge portion extending laterally from the main portion to the outside edge, the edge portion including:
      a receptacle aligned with the lateral passageway along the first end of the row, and
      a pivot member longitudinally aligned with the receptacle and having a pivot axis laterally aligned with the lateral passageway along the second end of the row,
      wherein the pivot member at the second end of a row is pivotally received in the receptacle at the first end of an adjacent row to pivotally connect the edge modules of adjacent rows;
      wherein the pivot member comprises an arm extending longitudinally from the edge portion and a pivot at the distal end of the arm defining the pivot axis.

14. A conveyor belt as in claim 13 wherein each of the rows includes an edge module at each of the first and second side edges.

15. A conveyor belt as in claim 13 wherein the pivot member includes an aperture therethrough coaxial with the pivot axis.

16. A conveyor belt as in claim 13 wherein the pivot has sides that converge with distance from the arm.

17. A conveyor belt as in claim 13 wherein the receptacle includes a pair of laterally spaced side walls having apertures therethrough aligned with the lateral passageway.

18. A conveyor belt as in claim 13 wherein the receptacle has a slot opening onto the first end of the edge portion and extending to an open cylindrical cavity having an axis aligned with the apertures through the first set of hinge elements.

19. A conveyor belt as in claim 13 wherein the receptacle and the pivot member are proximate the outside edge of the row.

20. A conveyor belt as in claim 13 wherein the receptacle and the pivot member are positioned midway along the edge portion.

21. A conveyor belt as in claim 13 wherein the edge module comprises a lateral rib midway between the first and second ends from which the hinge elements of the first and second sets extend and a lateral bar traversing a portion of the hinge elements between the lateral rib and the first end, wherein the lateral rib and the lateral bar connect the edge portion to the main portion.

22. A conveyor belt as in claim 13 wherein the ends of the hinge rods reside in the edge portions at the first and second outside edges of each row.

23. A conveyor belt as in claim 13 wherein the hinge rod is made of a plastic material that absorbs water.

24. A conveyor belt as in claim 23 wherein the plastic material is nylon 6 6.

25. A conveyor belt as in claim 13 wherein the edge portion of each edge module includes a laterally elongated link end extending laterally along the first end of the row from the main portion to the outside edge.

26. A conveyor belt as in claim 25 wherein the edge portion further includes a surface laterally aligned with the passageway through the first set of hinge elements and disposed along the laterally elongated link end at a distance from the main portion great enough to allow the hinge rod along the first end of the row to lengthen without pushing outward against the surface.

* * * * *